United States Patent Office 2,731,443
Patented Jan. 17, 1956

---

2,731,443

VULCANIZED RUBBER STABILIZED WITH A MIXTURE OF A DI(HYDROXYPHENYL) SULFIDE AND A DI(ALKYLHYDROXYPHENYL) METHANE

Lawrence E. Forman, Akron, Ohio, assignor to The Firestone Tire & Rubber Company, Akron, Ohio, a corporation of Ohio No Drawing. Application September 20, 1952,
Serial No. 310,726

19 Claims. (Cl. 260—45.95)

This invention relates to inhibition of the deterioration of vulcanized rubber compositions. The rubber compositions may be those used in tires, inner tubes, foamed rubber products, rubber thread, and other rubber articles. The compositions consist essentially of natural rubber, the known sulfur vulcanizable synthetic rubbers, or mixtures of any of these rubbers.

The deterioration of rubber is evidenced in different ways and different tests have been devised to determine the effect of different conditions on rubber compositions. Thus, for example, in pneumatic tires, inner tubes and power-transmitting belts the preservation of the tensile strength of the rubber is important.

It is also important to preserve the white, or nearly white, color of rubber compositions designed for many uses. Thus, in white-sidewall tires and in foamed latex mattresses, pillows and upholstery padding, the preservation of the light color of the rubber vulcanizate is desirable. The mixture of inhibitors to which this invention relates preserves the rubber with little or no change in its color.

The mixed inhibitor of this invention includes a di(hydroxyphenyl)sulfide and a di(alkylhydroxyphenyl)methane.

The mixed inhibitor has unexpected inhibiting value. It preserves the rubber well compared to the protection afforded by either component alone, and in some instances it has been found to preserve the rubber better than either component alone. The components may be present in the same or different amounts. They be added to the rubber individually or together. A small amount of the mixed inhibitor is used, up to several parts of each component in one hundred parts of rubber.

The diphenol sulfide is ordinarily prepared by reacting a phenol with sulfur chloride or sulfur dichloride, with or without sulfur, utilizing at least about one mole of the sulfur chloride for each two moles of the phenol. The phenol groups in each molecule may be the same or different. They may be unsubstituted or they may contain one or more hydrocarbon substituents. They are preferably alkyl substituted. The monosulfides are preferred, and in the following table they alone are named specifically, although it is to be understood that the corresponding disulfides and polysulfides may be used in their stead. The diphenol monosulfides employed in accordance with the invention are those in which the phenol nuclei are from the class consisting of those with 2-hydroxy and 4-hydroxy nuclei, and include:

Di(4-hydroxyphenyl)monosulfide
Di(2-hydroxy-5-phenylphenyl)monosulfide
Di(2-hydroxy-5-t-amylphenyl)monosulfide
Di(3,5-dimethyl-4-hydroxyphenyl)monosulfide
Di(3-methyl-4-hydroxy-5-butylphenyl)monosulfide
Di(3-amyl-4-hydroxyphenyl)monosulfide
Di(2-methyl-4-hydroxy-5-butylphenyl)monosulfide
Di(2-methyl-4-hydroxy-5-propylphenyl)monosulfide
Di(3-phenyl-4-hydroxyphenyl)monosulfide
Di(2-methyl-4-hydroxy-5-cyclohexylphenyl)monosulfide
Di(2-hydroxy-3-butyl-6-methylphenyl)monosulfide
Di(2-hydroxy-3-butyl-5-methylphenyl)monosulfide
Di(2-hydroxy-3-t-butyl-5-methylphenyl)monosulfide
Di(2-hydroxy-3-methyl-5-phenylphenyl)monosulfide
Di(2-hydroxy-3,5-di-sec-amylphenyl)monosulfide
Di(2-hydroxy-3-butyl-5,6-dimethylphenyl)monosulfide
Di(2-hydroxy-3-cyclohexyl-5-ethylphenyl)monosulfide
Di(2-methyl-4-hydroxy-5-t-butylphenyl)monosulfide In the foregoing, butyl is preferably but not necessarily tert-butyl, and amyl is preferably tert- or sec-amyl. Butyl or amyl radicals may be replaced by the tt-octyl radical (2,2,4,4-tetramethylbutyl-), etc. The number of carbon atoms in each alkyl substituent may total twenty or more.

The other component of the mixed inhibitor is a di(hydroxyphenyl)methane which has the formula

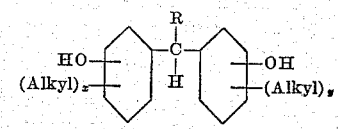

in which $x$ and $y$ are each numbers greater than zero and not greater than 2, each alkyl is a straight or branched-chain radical of 1 to 16 carbon atoms, the phenol nuclei are selected from the class consisting of the 2-hydroxy and 4-hydroxy nuclei, and R is of the group consisting of hydrogen and alkyl groups of 1 to 10 carbon atoms. These compounds are ordinarily prepared by condensing a phenol with an aldehyde. The two phenol nuclei are the same or different. The substituent groups of the phenol nuclei include methyl, ethyl, propyl, butyl, amyl, hexyl, heptyl, octyl, nonyl, benzyl, alpha-methylbenzyl, beta-phenylethyl radicals, etc., including straight-chain and branched-chain alkyl substituents up to and including chains of 16 carbon atoms. The aldehyde condensing agent is formaldehyde, paraform, trioxane, acetaldehyde, paraldehyde, propionaldehyde, a butyraldehyde, a hexaldehyde, a nonaldehyde, benzaldehyde, etc. Representative compounds which are used as this component of the invention include:

Di(2-hydroxy-3,5-dimethylphenyl)methane
Di-1,1-(2-hydroxy-3,5-dimethylphenyl)ethane
Di(2-hydroxy-3-butyl-5-methylphenyl)methane
Di-1,1-(2-hydroxy-3-butyl-5-methylphenyl)ethane
Di-1,1-(2-methyl-4-hydroxy-5-butylphenyl)ethane
Di-1,1-(2-methyl-4-hydroxy-5-amylphenyl)ethane
Di(2-methyl-4-hydroxy-5-octylphenyl)methane
Di-1,1-(3-methyl-4-hydroxy-6-methylphenyl)butane
Di-1,1-(2-methyl-4-hydroxy-5-butylphenyl)butane
Di-1,1-(2-hydroxy-3,5-dimethylphenyl)nonane
Di(2-hydroxy-3,5-di-alpha-methylbenzylphenyl)methane In the foregoing formula, butyl is preferably t-butyl, and amyl is preferably t-amyl or sec-amyl. Wherever butyl or amyl is mentioned, octyl may be substituted, and the compounds containing any of these three substituents are preferred.

Tests were run to determine the effect on the tensile strength of rubber, of several inhibitors alone and in combination. The rubber was tested before and after aging, and the per cent of tensile retained by the rubber was calculated. These values and the results of other tests are given in the accompanying tables. (Throughout the specification, tensile strengths are measured in pounds per square inch and "parts" means parts by weight per 100 parts of rubber.)

A number of samples were compounded according to the following formula:

| | Parts |
|---|---|
| Rubber | 100 |
| Zinc oxide | 70 |
| Titanium dioxide | 20 |
| Blue coloring | 0.2 |
| Stearic acid | 1.2 |
| Sulfur | 3.0 |
| Wax | 2.0 |
| Accelerator | 0.9 |
| Inhibitor | 1.0 |

The rubber compositions were cured 60 minutes at 280° F. The cured compositions were aged 48 hours in a circulating-air-oven at 212° F. The tensile strengths of the different rubber compositions were determined before and after aging, and the per cent tensile strength retained, was calculated.

The inhibitors used in the different samples are identified in the following list:

Sample A.—1.0 part of di(3,5-dimethyl-4-hydroxyphenyl)methane.

Sample B.—1.0 part of di-1,1-(2-methyl-4-hydroxy-5-t-butylphenyl)ethane, the condensation product of paraldehyde and monobutyl-meta-cresol.

Sample C.—0.5 part of di(3,5-dimethyl-4-hydroxyphenyl)methane and 0.5 part of di(4-hydroxyphenyl)monosulfide.

Sample D.—0.5 part of di-1,1-(2-methyl-4-hydroxy-5-t-butylphenyl)ethane and 0.5 part of di(4-hydroxyphenyl)monosulfide.

Sample E.—0.5 part of di(3,5-dimethyl-4-hydroxyphenyl)methane and 0.5 part of di(2-hydroxy-3,5-di-sec-amylphenyl)monosulfide.

Sample F.—0.5 part of di(2-hydroxy-3-t-butyl-5-methylphenyl)methane and 0.5 part of di(2-hydroxy-3,5-di-sec-amylphenyl)monosulfide.

Sample G.—0.5 part of di-1,1-(2-methyl-4-hydroxy-5-t-butylphenyl)ethane and 0.5 part of di(2-hydroxy-3,5-di-sec-amylphenyl)monosulfide.

The tensile strengths, before and after aging, are recorded in the following table together with results of oxygen-absorption studies conducted as described by J. R. Shelton and Hugh Winn in Industrial and Engineering Chemistry, vol 38, page 71 (1946); ibid., vol. 40, page 2081 (1948).

| Sample | Normal Tensile | Aged Tensile | Percent Tensile Retained |
|---|---|---|---|
| A | 3,575 | 2,600 | 72.7 |
| B | 3,650 | 2,575 | 70.5 |
| C | 3,375 | 2,300 | 68.1 |
| D | 3,550 | 2,550 | 71.8 |
| E | 3,400 | 2,550 | 75.0 |
| F | 3,375 | 2,625 | 77.9 |
| G | 3,550 | 2,550 | 71.9 |

It is known that the di(4-hydroxyphenyl)monosulfide and di(2-hydroxy-3,5-di-sec-amylphenyl)monosulfide, both well-known antioxidants, give relatively poor protection alone in such test. It is surprising that the mixtures, in half quantities, give as good protection, compared to a full amount of the respective di(hydroxyphenyl)methanes.

Another test was made, employing the foregoing compounding formula, to compare the effectiveness of an inhibitor of this invention with octylated cresylic acid. One part of the latter (designated Sample X) was used and a mixture of 0.5 part of di(2-methyl-4-hydroxy-5-t-butylphenyl)methylmethane and 0.5 part of crystalline di(3-methyl-6-t-butylphenol)sulfide (designated Sample Y). The rubber compositions were cured 60 minutes at 280° F. The results of the test are recorded in the following table:

| | Sample X | Sample Y |
|---|---|---|
| Properties of Unaged Vulcanizate: | | |
| 400% Modulus | 850 | 850 |
| Tensile at break | 3,575 | 3,575 |
| Elongation percent | 630 | 640 |
| After 2 days in Oven at 212° F.: | | |
| 400% Modulus | 925 | 925 |
| Tensile at break | 2,425 | 2,575 |
| Elongation percent | 550 | 580 |
| Retained tensile do | 67.9 | 72.1 |
| Retained elongation do | 87.3 | 90.6 |
| After Oxygen Absorption: | | |
| 400% Modulus | 200 | 300 |
| Tensile at break (average of 6) | 320 | 850 |
| Elongation (average of 6) | 320 | 430 |
| Tensile at break (best strip) | 800 | 1,025 |
| Elongation (best strip) percent | 440 | 450 |
| Hours in oxygen | 101 | 125.75 |
| Average tensile loss per hour | 32.2 | 21.7 |
| Oxygen Absorption at 90° C.: | | |
| Hours to absorb 5 ml. oxygen/gm. polymer | 55 | 60 |
| Hours to absorb 10 ml. oxygen/gm. polymer | 90 | 98 |

The results show that the mixture of this invention compares very favorably with the good inhibitor of Sample X.

Tests were made on latex films and foamed latex products. Foamed latex products were made according to the following formula:

*Foamed latex formula*

| | Dry Weight | Wet Weight |
|---|---|---|
| | Parts | Parts |
| Hevea latex | 100.0 | 160.0 |
| Sulfur | 2.0 | 4.0 |
| Potassium oleate | 2.0 | 10.0 |
| Accelerator | 2.5 | 5.5 |
| Sensitizer | 0.5–1.0 | 1.0–2.0 |
| Zinc oxide | 5.0 | 12.5 |
| Sodium silico fluoride | 0.5–1.5 | 1–3 |
| Inhibitor | 1.0 | 2.5 |
| Water to obtain 57% total solids | | variable |

Latex formulations were made using (1) one part of di-1,1 - (2 - methyl - 4 - hydroxy - 5 - t - butylphenyl)ethane, the condensation product of monobutyl-meta-cresol and paraldehyde, (2) one part of di(2-hydroxy-3,5-di-sec-amylphenyl)monosulfide, and (3) 0.5 part of di-1,1-(2-methyl - 4 - hydroxy - 5 - t - butylphenyl)ethane and 0.5 part of di(2 - hydroxy - 3,5 - di - sec - amylphenyl)-monosulfide. The three latex compositions were beaten to a froth in known manner, poured into a cylindrical mold, and cured 45 minutes at 100° C. in open steam. The resulting foam products were given a southern exposure indoors behind a window for thirty days. The sample containing the mixed inhibitor discolored less than the samples containing the individual inhibitors. The effect of the mixed inhibitor therefore was not merely additive, but the mixed inhibitor gave a lighter product than either inhibitor alone.

Comparable results were obtained under artificial light. Other samples of these three foam products were heated in a circulating-air-oven at 150° C. and observed from time to time to determine which melted down or collapsed the more quickly. Sample No. 3 was almost as good as Sample No. 1, and both were much better than Sample No. 2. The resistance of Sample No. 3 was much better than the mere additive effect of the two components.

Dried, cast films were prepared from natural latex compounded as follows:

Latex film formula

|  | Dry Weight | Wet Weight |
|---|---|---|
|  | Parts | Parts |
| Hevea latex | 100.0 | 160.0 |
| KOH | 0.6 | 3.0 |
| Ammonium caseinate | 0.5 | 5.0 |
| Sulfur | 1.5 | 3.0 |
| Accelerator | 1.0 | 2.0 |
| Zinc oxide | 3.0 | 7.5 |
| Water | | 5.8 |
| Inhibitor | 1.0 | 2.5 |

Three samples were prepared containing inhibitors as follows:

*Sample 4.*—1.0 part of di(2-hydroxy-3,5-sec-amylphenyl)monosulfide.

*Sample 5.*—1.0 part of di-1,1-(2-methyl-4-hydroxy-5-t-butylphenyl)ethane, the condensation product described above.

*Sample 6.*—0.5 part of di(2-hydroxy-3,5-sec-amylphenyl)monosulfide and 0.5 part of di-1,1-(2-methyl-4-hydroxy-5-t-butylphenyl)ethane.

The films were cured one hour at 100° C. The tensile strengths of the unaged samples were obtained, and they are referred to herein as normal tensile. The samples were then oven-aged 48 hours at 100° C. and also 21 days at 70° C. The per cent tensile retained in each instance was calculated. The results of this test are shown in the following table:

|  | Sample 4 | Sample 5 | Sample 6 |
|---|---|---|---|
| Normal tensile | 5,300 | 4,400 | 5,120 |
| Tensile after 48 hours at 100° C | 800 | 1,250 | 1,475 |
| Percent tensile retained | 15 | 28 | 29 |
| Tensile after 21 days at 70° C | 3,000 | 2,925 | 3,275 |
| Percent tensile retained | 57 | 67 | 64 |

In each case, the actual aged tensile strength of Sample No. 6 is significantly higher than that of either Sample No. 4 or Sample No. 5, and the per cent retained is better than for Sample No. 4 and substantially equal to the value for Sample No. 5.

Further samples were tested which contained as inhibitor:

*Sample 7.*—1.0 part of the condensation product of 1 mol of formaldehyde and 2 mols of 2-tert-octyl-4-methylphenol.

*Sample 8.*—0.5 part of di(4-hydroxyphenyl)monosulfide and 0.5 part of the condensation product of Sample 7.

The results are recorded in the following table:

|  | Sample 7 | Sample 8 |
|---|---|---|
| Normal tensile | 4,750 | 5,400 |
| Tensile after 21 days at 70° C | 3,400 | 4,050 |
| Percent tensile retained | 72 | 75 |

Di(4-hydroxyphenyl)monosulfide, a well-known antioxidant, does not give very good protection against heat. It is surprising that the mixture gave such good results compared to Sample No. 7. Both samples gave better results than would a sample containing one part of di(4-hydroxyphenyl)monosulfide.

The foregoing shows that under a variety of different circumstances a mixture of the monosulfide and the condensation product inhibits deterioration to a greater extent than either compound alone.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e. g. cyclohexyl benzothiazole sulfenamide, thiazoline sulfenamides, thiocarbamyl sulfenamides, mercaptothiazoles, mercaptothiazolines, thiazolyl mono- and di-sulfides, the dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned where desired, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butyl xanthate, zinc ethyl xanthate, zinc salt of mercaptobenzothiazole, zinc dimethyl dithiocarbamate, and zinc dibutyl dithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

What I claim is:

1. A sulfur-vulcanized rubber composition which includes as an inhibitor of deterioration a small amount of di(hydroxyphenyl)sulfide and a small amount of di(hydroxyphenyl) methane; the hydroxyphenyl groups of the sulfide being of the class which consists of unsubstituted and hydrocarbon-substituted 2-hydroxyphenyl and 4-hydroxyphenyl groups; and the di(hydroxyphenyl)methane having the formula

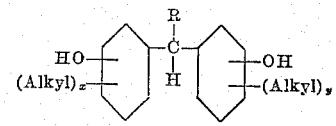

in which $x$ and $y$ are 1 to 4, each alkyl contains one to sixteen carbon atoms, the hydroxy nuclei are selected from the class consisting of the 2-hydroxy and 4-hydroxy nuclei and R is of the group consisting of hydrogen and alkyl groups of one to ten carbon atoms.

2. The rubber composition of claim 1 in which the di(hydroxyphenyl)sulfide is a monosulfide.

3. The rubber composition of claim 1 in which the di(hydroxyphenyl)sulfide is a di(alkylphenol)monosulfide.

4. The rubber composition of claim 1 in which the di(hydroxyphenyl)sulfide is di(4-hydroxyphenyl)monosulfide.

5. The rubber composition of claim 1 in which the di(hydroxyphenyl)sulfide is di(2-hydroxy-3,5-di-sec-amylphenyl)monosulfide.

6. The product of claim 1 in which the rubber composition is a foamed latex.

7. The process of vulcanizing rubber which comprises sulfur-vulcanizing rubber which contains as an inhibitor of deterioration a small amount of di(hydroxyphenyl)-sulfide and a small amount of di(hydroxyphenyl)methane; the hydroxyphenyl groups of the sulfide being of the class which consists of unsubstituted and hydrocarbon-substituted 2-hydroxyphenyl and 4-hydroxyphenyl groups; and the di(hydroxyphenyl)methane having the formula

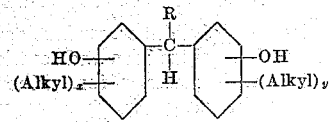

in which $x$ and $y$ are 1 to 4, each alkyl contains one to sixteen carbon atoms, the hydroxy nuclei are selected from the class consisting of the 2-hydroxy and 4-hydroxy nuclei and R is of the group consisting of hydrogen and alkyl groups of one to ten carbon atoms.

8. The process of claim 7 in which latex is vulcanized.

9. The process of claim 7 in which the di(hydroxyphenyl)sulfide is a monosulfide.

10. The process of claim 7 in which the di(hydroxyphenyl)sulfide is a di(alkylphenol)monosulfide.

11. The process of claim 7 in which the di(hydroxyphenyl)sulfide is di(4-hydroxyphenyl)monosulfide.

12. The process of claim 7 in which the di(hydroxyphenyl)sulfide is di(2 - hydroxy - 3,5 - di-sec-amylphenyl)monosulfide.

13. A sulfur-vulcanized rubber composition which includes as an inhibitor of deterioration a small amount of di(4-hydroxyphenyl)monosulfide and a small amount of a di(hydroxyphenyl)methane formed by condensation of 1 mol of formaldehyde and 2 mols of 2-tert-octyl-4-methylphenol.

14. A sulfur-vulcanized rubber composition which includes as an inhibitor of deterioration a small amount of di(2 - hydroxy - 3,5 - di - sec - amylphenyl)monosulfide and a small amount of di(2 - hydroxy - 3 - tert-butyl - 5 - methylphenyl) methane.

15. A sulfur-vulcanized rubber composition which includes as an inhibitor of deterioration a small amount of di(4-hydroxyphenyl)monosulfide and a small amount of di-1,1-(2-methyl-4-hydroxy-5-tert-butylphenyl)ethane.

16. A sulfur-vulcanized rubber composition which includes as an inhibitor of deterioration a small amount of di(2 - hydroxy - 3,5 - di - sec - amylphenyl)monosulfide and a small amount of di-1,1-(2-methyl-4-hydroxy-5-tert-butylphenyl)ethane.

17. A sulfur-vulcanized rubber composition which includes as an inhibitor of deterioration a small amount of di(3 - methyl - 6 - tert - butylphenol)sulfide and a small amount of di - 1,1 - (2 - methyl - 4 - hydroxy - 5-tert-butylphenyl)ethane.

18. A sulfur-vulcanized rubber composition which includes as an inhibitor of deterioration a small amount of di(4-hydroxyphenyl)monosulfide and a small amount of di(3,5-dimethyl-4-hydroxyphenyl)methane.

19. A sulfur-vulcanized rubber composition which includes as an inhibitor of deterioration a small amount of di(2 - hydroxy - 3,5 - di - sec - amylphenyl)monosulfide and a small amount of di(3,5-dimethyl-4-hydroxyphenylmethane.

References Cited in the file of this patent

UNITED STATES PATENTS

| | | |
|---|---|---|
| 1,989,788 | Calcott et al. | Feb. 5, 1935 |
| 2,295,985 | Baird et al. | Sept. 5, 1942 |
| 2,364,338 | Beaver | Dec. 5, 1944 |

FOREIGN PATENTS

| | | |
|---|---|---|
| 719,076 | France | Feb. 1, 1932 |